United States Patent
Viswanathan et al.

(12) 
(10) Patent No.: US 9,858,016 B2
(45) Date of Patent: Jan. 2, 2018

(54) PROVIDING DEVICE FUNCTIONALITY UTILIZING AUTHORIZATION TOKENS

(71) Applicant: Hewlett-Packard Development Company, L.P., Houston, TX (US)

(72) Inventors: Kapaleeswaran Viswanathan, Bangalore (IN); Jitendra Kumar, Bangalore (IN)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 15/120,460

(22) PCT Filed: Apr. 8, 2014

(86) PCT No.: PCT/IN2014/000218
§ 371 (c)(1),
(2) Date: Aug. 19, 2016

(87) PCT Pub. No.: WO2015/155780
PCT Pub. Date: Oct. 15, 2015

(65) Prior Publication Data
US 2017/0068490 A1    Mar. 9, 2017

(51) Int. Cl.
*G06F 3/12* (2006.01)
*H04L 9/32* (2006.01)
(Continued)

(52) U.S. Cl.
CPC .......... *G06F 3/1204* (2013.01); *G06F 3/1222* (2013.01); *G06F 3/1238* (2013.01);
(Continued)

(58) Field of Classification Search
None
See application file for complete search history.

(56) References Cited

U.S. PATENT DOCUMENTS 8,464,322 B2    6/2013   Narjala
2004/0145773 A1*  7/2004   Oakeson ................. G06F 21/56
                                        358/1.15
(Continued)

FOREIGN PATENT DOCUMENTS

CN    102880434 A    1/2013
EP    2151795 A1    2/2010
EP    2685752 A1    1/2014

OTHER PUBLICATIONS

Delegated Printing: Nominating Other Staff to Print for You, (Research Paper), Aug. 12, 2013, 2 pages, https://support.deakin.edu.au/.

(Continued)

*Primary Examiner* — Andrew H Lam
(74) *Attorney, Agent, or Firm* — HP Inc. Patent Department

(57) ABSTRACT

In one example of the disclosure, a request for an authorization token is received via a network from a first computing device having authorization, to utilize functionality at a second computing device. The token is to provide for a third computing device a limited authorization to utilize the functionality. The token is sent to the third device. Subject data and the token are received from the third device. Validity of the token is confirmed. The subject data is sent to the second device for the second device to utilize the functionality in association with the subject data, with security accountability traceable to the first device.

15 Claims, 7 Drawing Sheets

(51) Int. Cl.
*G06F 21/60* (2013.01)
*G06F 21/30* (2013.01)

(52) U.S. Cl.
CPC ............ *G06F 3/1288* (2013.01); *G06F 21/30* (2013.01); *G06F 21/608* (2013.01); *H04L 9/3228* (2013.01)

(56) References Cited

U.S. PATENT DOCUMENTS

2010/0212004 A1* 8/2010 Fu ..................... G06F 21/6218
 726/9
2012/0102548 A1 4/2012 Tamura
2012/0117629 A1 5/2012 Miyazawa et al.

OTHER PUBLICATIONS

Followme Printing, (Research Paper), Aug. 9, 2012, 2 pages, found at http://business.toshiba.com/media/downloads/.

* cited by examiner

PROVIDING DEVICE FUNCTIONALITY UTILIZING AUTHORIZATION TOKENS

BACKGROUND

A user of a notebook computer, smartphone, or other first computing device may choose to send subject data to a second computing device for processing. For instance a user of a first computing device may send subject data in the form of a print job to a printer for printing. The print job may include a document, image, or other content that is identified for printing via user interaction with an operating system, or a web browser or other application executing at the first device.

DRAWINGS

DETAILED DESCRIPTION

Introduction

Figure 1:
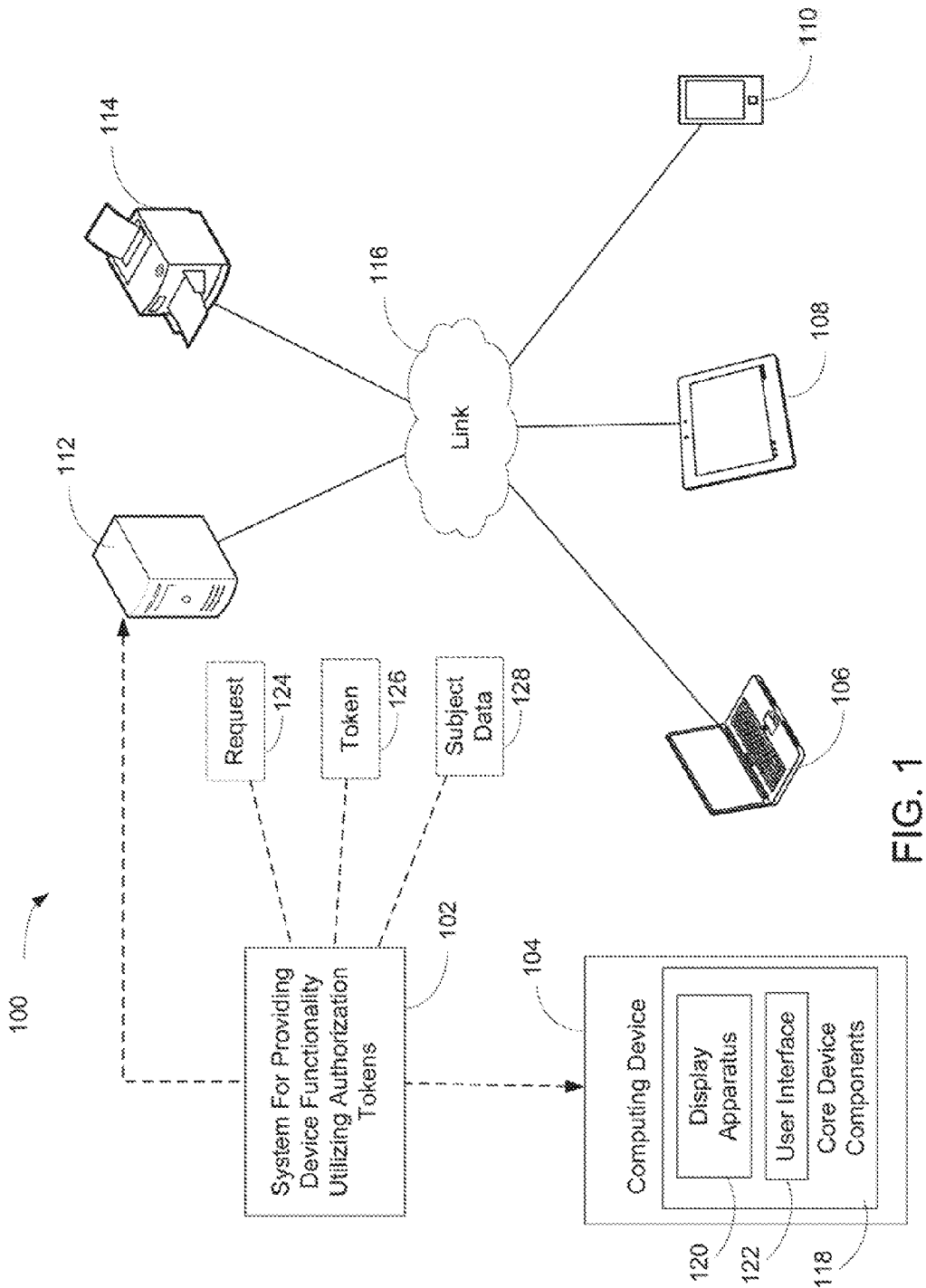
FIG. 1 is a block diagram depicting an example environment in which various embodiments may be implemented.

The user of a first computing device typically can send computing devices are part of a same enterprise network and are identified as authorized devices. In an example in which the first device is a smartphone, the second device is a printer, and the subject data is a print job, the smartphone may be recognized, by the printer or by a third computing device (e.g. a print server), as a device having enterprise authorization to send the job to the printer for printing.

However, today there can be occasions when it will be advantageous for an enterprise to make a facility printer available, on a limited basis to a user whose computing device is not authorized to send jobs to the printer (e.g. a non-employee user visiting the enterprise). As the enterprise printer or print server does not recognize the user's device, the visitor user may not be able to send the job directly to the printer. In response the visitor user typically resorts to one of two generally undesirable remedies. First, the visitor user may search for an IT administrator to ask the administrator to give the visitor printing rights. This can be a time-consuming exercise for both the visitor and the administrator, and can result in financial and security risks as the visitor is granted broad printing authorizations, or authorization for a time greater than necessary to accomplish the task at hand. Alternatively, the visitor may ask an enterprise employee user that has printing authorization to for permission email the print job to the employee, and ask the employee to print the job and deliver the printout to the visitor. This second situation is likewise suboptimal from usability and personnel bandwidth perspectives.

To address these issues, various embodiments described in more detail below provide for a system and a method to provide device functionality in association with subject data utilizing authorization tokens. In examples, a request for an authorization token is received, via a network, from a first computing device having authorization to utilize a functionality at a second computing device. The token is to provide to a third computing device a limited authorization to utilize the functionality. The token is sent to the third device. Subject data and the token are received from the third device. Validity of the token is confirmed. The subject data is sent to the second device for the second device to utilize the functionality in association with the subject data with security accountability traceable to the first device.

In a particular example, the disclosed embodiments provide for a system and a method to provide device printer functionality in association with a print job utilizing authorization tokens. In an example, a request for an authorization token is received, via a network and from a first computing device having authorization to utilize a functionality at a printer. The token is to provide to a second computing device a limited authorization to utilize the printer functionality. The token is sent to the second computing device. A print job and the token are received from the second device. Validity of the token is confirmed. The print job is sent to the printer for the printer to utilize the functionality in association with the job, with security accountability for utilizing the functionality traceable to the first device.

In this manner, examples described herein may present an automated and efficient manner to enable enterprise users that have the ability to exercise functionality at a network-connected computing device to delegate their ability to exercise the functionality in a controlled fashion to other users. Disclosed examples provide a method and system to enable a user with the ability to exercise a device functionality (e.g. an ability to read or write files stored in a remote data repository such as cloud storage, or to print at a printing device), to delegate a limited set of the user's device functionality capabilities (e.g., the ability to read or write a document or limited number of documents at the data repository, or the ability to print a page or a limited number of pages at a printer) to another user in a manner that holds the delegating user to system accountability for each exercise of the functionality.

Examples described herein may enable users without rights to utilize device functionality without hailing an IT administrator request visitor device functionality rights, or sending subject data to an enterprise employee with device functionality authorization and asking the employee to perform exercise the device functionality on behalf of the visitor.

Examples described herein may save time for the visitor, and for the IT administrator or enterprise employees that the visitor would otherwise contact for assistance. Examples described herein may also reduce the financial and security risks that are common when a visitor user is granted device functionality authorizations that are broader than necessary to accomplish a given task. Examples described herein may afford an enterprise the ability to grant limited authorization to a visiting user with respect to its systems, and may therefore increase enterprise and visitor users' satisfaction with the enterprise and its systems, and with the applications, and computing devices utilized by the enterprise.

The following description is broken into sections. The first, labeled "Environment" describes an environment in which various embodiments may be implemented. The second section, labeled "Components," describes examples of various physical and logical components for implementing various embodiments. The third section, labeled "Illustrative Example," presents an example of determining image rescale factors using record-relevancy tiers. The fourth section, labeled as "Operation," describes steps taken to implement various embodiments.

Environment:

FIG. 1 depicts an example environment 100 in which embodiments may be implemented as a system 102 to provide device functionality in association with subject data utilizing authorization tokens. Environment 100 is show to include computing device 104, client devices 106, 108, and 110, server device 112, and printer 114. Components 104-114 are interconnected via link 116.

Link 116 represents generally any infrastructure or combination of infrastructures configured to enable an electronic connection, wireless connection, other connection, or combination thereof, to enable data communication between components 104-114. Such infrastructure or infrastructures may include, but are not limited to, one or more of a cable, wireless, fiber optic, or remote connections via telecommunication link, an infrared link, or a radio frequency link. For example, link 116 may represent the internet, one or more intranets, and any intermediate routers, switches, and other interfaces. As used herein an "electronic connection" refers generally to a transfer of data between components, between two computing devices, that are connected by an electrical conductor. A "wireless connection" refers generally to a transfer of data between two components, e.g., between two computing devices, that are not directly connected by an electrical conductor. A wireless connection may be via a wireless communication protocol or wireless standard for exchanging data.

Client devices 106-110 represent generally any computing device with which a user may interact to communicate with other client devices, server device 112 and printer 114 via link 116. Server device 112 represents generally any computing device configured to serve an application and corresponding data for consumption by components 104-114.

Printer 114 represents generally any printing device, multifunction printing device, or other computing device configured to produce a physical printed representation of an image. Printer 114 may be a multifunction device that can perform a function such as scanning and/or copying in addition to printing. In examples, printer 114 may be a printer located in a printing system located in a commercial print provider facility. In other examples printer 114 may be a printer located in a home. In examples printer 114 may be thermal inkjet printer, a piezoelectric inkjet printer, a latex ink printer, a solid ink printer, a laser printer, or any other type of printer that ejects a colorant or colorants to form an image. Printer 114 includes hardware and programming for providing printing functions. Printer 114 may include an operating system to cause the printer to interpret print data, and a printing element to cause the application of one or more colorants upon a media according to mapping provided by print data, to thereby form an image upon a media.

Computing device 104 represents generally any computing device with which a user may interact to communicate with client devices 106-110, server device 112, and/or printer 114 via link 116. Computing device 104 is shown to include core device components 118. Core device components 118 represent generally the hardware and programming for providing the computing functions for which device 104 is designed. Such hardware can include a processor and memory, a display apparatus 120, and a user interface 122. The programming can include an operating system and applications. Display apparatus 120 represents generally any combination of hardware and programming configured to exhibit or present a message, image, view, or other presentation for perception by a user, and can include, but is not limited to, a visual, tactile or auditory display. In examples, the display device may be or include a monitor, a touchscreen, a projection device, a touch/sensory display device, or a speaker. User interface 122 represents generally any combination of hardware and programming configured to enable interaction between a user and device 104 such that the user may effect operation or control of device 104. In examples user interface 122 may be, or include, a keyboard, keypad, or a mouse. In some examples, the functionality of display apparatus 120 and user interface 122 may be combined, as in the case of a touchscreen apparatus that may enable presentation of images at device 104, and that also may enable a user to operate or control functionality of device 104.

System 102, discussed in more detail below, represents generally a combination of hardware and programming configured to enable provision of device functionality utilizing authorization tokens. System 102 is to receive a request 124 for an authorization token. The request 124 is received via a network from a first computing device with authorization to utilize a functionality at a second computing device. As used herein, a "network" refers generally to a collection of computing devices interconnected by communications channels that facilitates communications and allows sharing of resources and information among the interconnected devices. A "request" refers generally to a message, instruction, or command made in order to obtain something, e.g. a token. A "token" refers generally to data or programming to entitle a device in possession of the token to certain privileges, capabilities, or rights.

The request 124 is for a token 126 that, when in the possession of a third computing device, will provide the third device with a limited authorization to utilize specified functionality at the second device. As used herein, a "limited authorization" made available to a third device with respect to a functionality refers generally to an authorization that is less than the authorization that is available to the first device. Responsive to receipt of the request, system 102 is to send the token 126 to the third device.

In an example, a user at the third device may cause the third device to send to system 102 the token 126 to authorize the use of the functionality at the third device, and to send subject data 128 to be utilized or acted upon in connection with the functionality. System 102 is to receive the token 126 and the subject data 128 from the third device, and to confirm the validity of the token 126.

In an example, after system 102 confirms the validity of the token 126. system 102 is to send the subject data 128 to the second device for the second device to utilize the functionality in association with the subject data 128. In examples, the received subject data may be an electronic document, and the second computing device functionality that is authorized by the token is a document creation, reading, editing, copying, deletion, or storage operation.

In other examples, the second computing device is a printer, the subject data is a print job, and the second device functionality authorized by the token is a printing or scanning operation. As used herein, a "printer" is synonymous with "printing device", and in examples may refer to a liquid inkjet printer, solid toner-based printer, liquid toner-based printer, a multifunctional device that performs a function such as scanning and/or copying in addition to printing, or any other electronic device or group of electronic devices that consume a marking agent to produce a printed print job or printed content.

As used herein, a "Print job" refers generally to content, e.g., an image, and/or instructions as to formatting and presentation of the content sent to a computer system for printing. In examples, a print job may be stored in a programming language and/or a numerical form so that the job can be stored and used in computing devices, servers, printers and other machines capable of performing calculations and manipulating data. As used herein, an "image" refers generally to a rendering of an object, scene, person, or abstraction such text or a geometric shape. In an example, a print job may be included in an email as an attachment, e.g., an attached document or image file, with the email being received by system 102. In another example, a print job may be included as text within a body of an email received by system 102. In other examples, system 102 may receive a print job as subject data from the third device by means other than email delivery.

Security accountability for the exercise of the functionality in conjunction with the subject data is traceable to the first computing device. As used herein "security accountability" refers generally to a condition or state or property of a system in which actions of the system are traced to a unique computing device such that the device or entity an entity associated with the device is held responsible for the system actions. In examples, security accountability may be a part of an organization's policy requirements, and may support non-repudiation, deterrence, fault isolation, intrusion detection and prevention, after-action recovery and/or legal policies or efforts. In an example, security accountability for utilizing the functionality may be traceable both to the first computing device (the delegator device) and to the third device (the delegatee device). In another example, the security accountability for utilizing the functionality may be traceable to the first device (the delegator device) and is not traceable to the third device (the delegatee device).

In some examples, system 102 may be wholly integrated within core device components 118. In other examples, system 102 may be implemented as a component of any of computing device 104, client devices 104-110, server device 112, or printer 114, where it may take action based in part on data received from core device components 118 via link 116. In other examples, system 102 may, be distributed across computing device 104, and any of client devices 106-110, server device 112, or printer 114. For example, if the second computing device is a printer and the subject data is a print job, receiving a request for an authorization token from a first computing device having authorization to print at the printer, and sending the token to a third computing device may be performed on computing device 104, while receiving the token and the print job from the third device, confirming the validity of the token, and sending the print job to the printer for printing may be performed by server device 112. Other distributions of system 102 across computing device 104, client devices 106-110, server device 112, and printer 114 are possible and contemplated by this disclosure. It is noted that all or portions of the system 102 to provide device functionality in association with subject data utilizing authorization tokens may also be included on client devices 106, 108 or 110.

Figure 2:
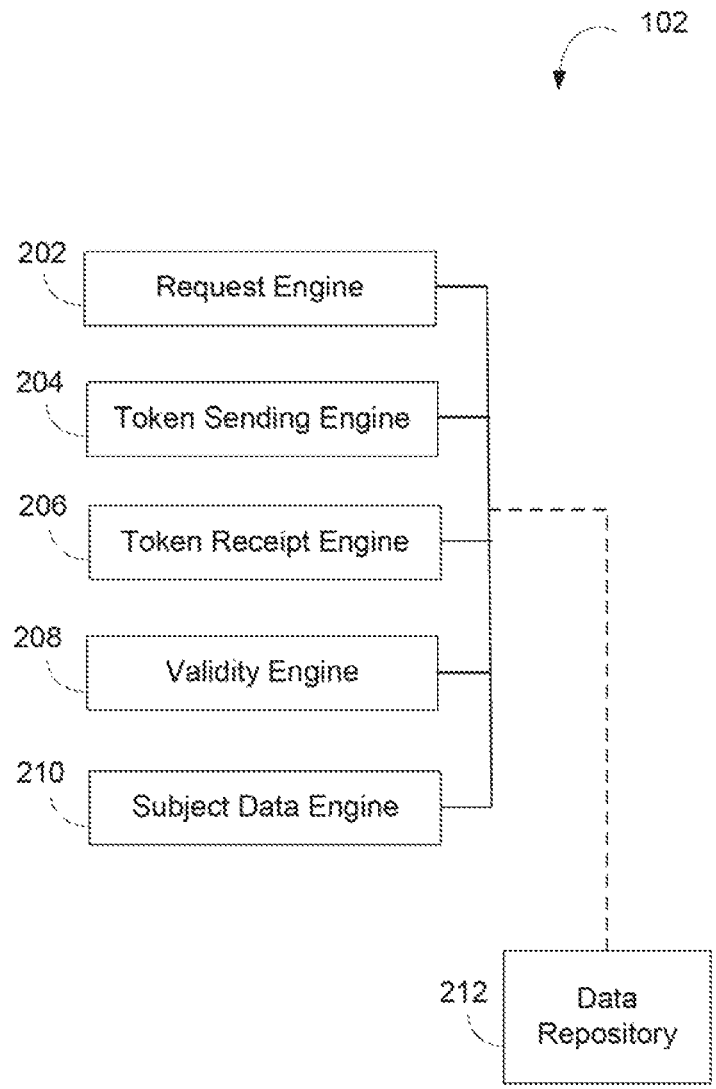
FIG. 2 is a block diagram depicting an example of a system to provide device functionality in association with subject data utilizing authorization tokens.

Components:

FIGS. 2, 3, 4, and 5 depict examples of physical and logical components for implementing various embodiments. In FIG. 2 various components are identified as engines 202, 204, 206, 208, 210. In describing engines 202, 204, 206, 208, 210, focus is on each engine's designated function. However, the term engine, as used herein, refers generally to a combination of hardware and programming configured to perform a designated function. As is illustrated later with respect to FIG. 4, the hardware of each engine, for example, may include one or both of a processor and a memory, while the programming may be code stored on that memory and executable by the processor to perform the designated function.

FIG. 2 is a block diagram depicting components of system to provide device functionality in association with subject data utilizing authorization tokens 102. In this example, system 102 includes request engine 202, token sending engine 204, token receipt engine 206, validity engine 208, and subject data engine 210. In performing their respective functions, engines 202, 204, 206, 208, 210 may access data repository 212. Repository 212 represents generally any memory accessible to system 102 that can be used to store and retrieve data.

Request engine 202 represents a combination of hardware and programming configured to receive, via a network and from a first computing device with authorization to employ a functionality at a second computing device, a request for an authorization token.

Token sending engine 204 represents a combination of hardware and programming configured to generate the token, and send the token to the third computing device to provide for the third device a limited authorization to employ the functionality. In an example, the limited authorization may be a limited authorization that includes an expration date for exercise of the functionality upon subject data. In another example, the limited authorization may be a number of times the functionality can be exercised with respect to subject data.

Token receipt engine 206 represents a combination of hardware and programming configured to receive the token and subject data from the third computing device. In examples, the token and subject data may be received via by token receipt engine 206 via a networking protocol, including but not limited to Transmission Control Protocol/Internet Protocol ("TCP/IP"), HyperText Transfer Protocol ("HTTP"), Simple Mail Transfer Protocol ("SMTP"), Extensible Messaging and Presence Protocol ("XMPP") and/or Session Initiation Protocol ("SIP"). The token and the subject data may be received by token receipt engine 206 via a local area network ("LAN"), or via the Internet, an intranet, or another wide area network ("WAN"). In an example, the token and subject data may be received via a proximity wireless protocol or personal area network ("PAN"), such as a Bluetooth™, or other near field communication connection.

Validity engine 208 represents a combination of hardware and programming configured to verify validity or authenticity of the token received token receipt engine 206. Subject data engine 220 represents a combination of hardware and programming configured to send the subject data to the second device for the second device to utilize the functionality in association with the subject data, with a security audit trail for utilizing the functionality indicating the first computing device. A "security audit trail" refers generally to a security-relevant chronological record, set of records, or destination and source of records that provide documentary evidence of activities attributable to, a unique computing device such that the device or entity an entity associated with the device is held responsible for system actions. In this manner, a user of the first device has delegated the first device's ability to exercise the functionality at the second device to a third device in a controlled fashion as security accountability remains traceable to the first device. The third device is enabled to utilize the functionality at the second device without the trouble of having an IT administrator add visitor device functionality rights, and without the security risks inherent in asking another user to exercise the device functionality (e.g. printing) on behalf of the visitor.

Figure 3:
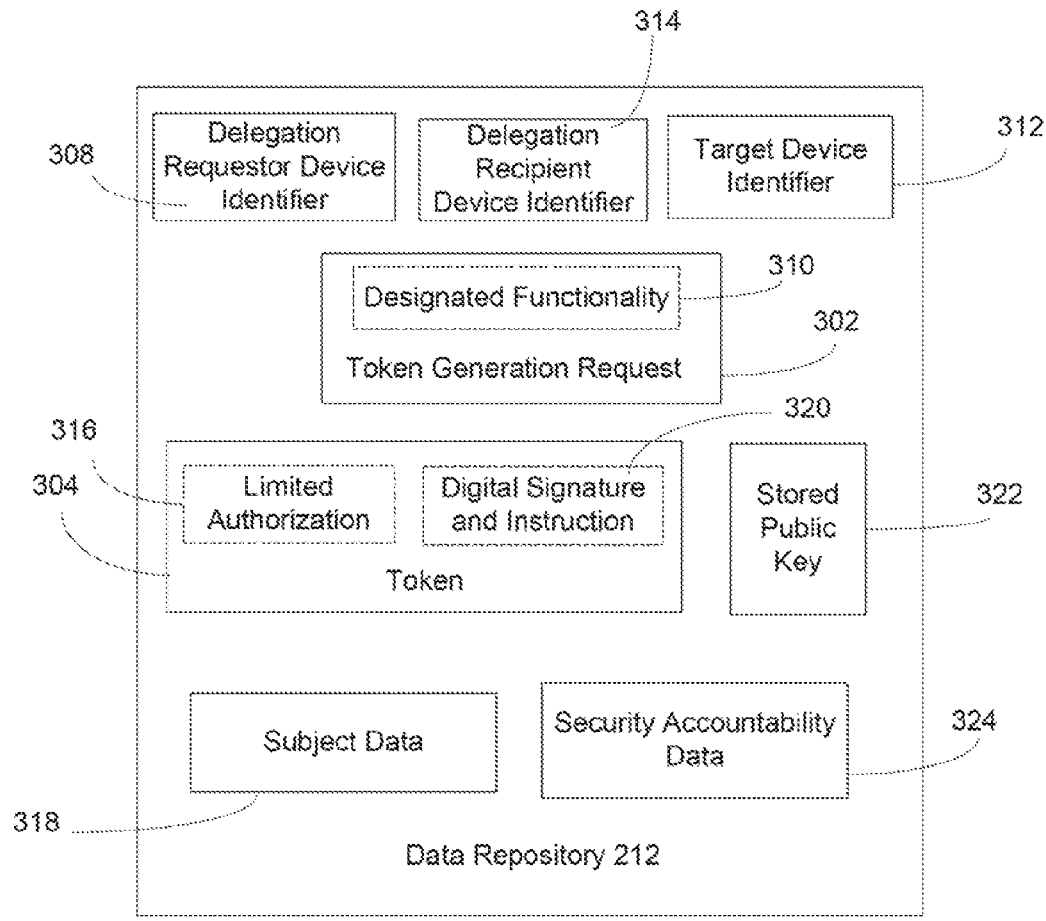
FIG. 3 is a block diagram depicting an example data structure for a system to provide device functionality in association with subject data utilizing authorization tokens.

FIG. 3 depicts an example implementation of data repository 212. In this example, repository 212 includes a token generation request 302, a token 304, an identifier for a delegation requestor device 308, a designated functionality 310, an identifier for a target device 312, an identifier for a delegation recipient device 314, a limited authorization 316, subject data 318, a digital signature and instruction 320, a public key 322, and security accountability data 324. Referring back to FIG. 2 in view of FIG. 3, in an example, request engine 202 (FIG. 2) receives, via a network 116 (FIG. 1) a request 302 for generation of an authorization token 304. The request is received from a delegation requestor device, identified by delegation requestor device identifier 308, that has authority to utilize a designated functionality 310 (e.g., an ability to print) at a target device (e.g., a printer) that is also connected to the network 116. Token 304 is to provide for a delegation recipient device, identified by delegation recipient device identifier 314, a limited authorization 316. In an example, the limited authorization 316 may be an authorization to utilize a designated functionality 310 that Masan end time or end date. In another example, the limited authorization 316 may be an authorization to utilize a designated functionality that is a printing functionality, e.g. a limited authorization print exclusively in black and white [e.g., versus color printing].

Token sending engine 204 (FIG. 2) causes generating and sending of a token 304 to the delegation recipient device. In the example of FIG. 3, the token 304 that is generated and sent includes a digital signature associated with a user of the first device and an instruction 320 that the functionality be provided for the delegation recipient device. As used herein, a "digital signature" refers generally to any electronic signature that encrypts electronic documents with a hash or other digital code to enable verification of the authenticity of the document (e.g., that the sender of the document is an authorized sender, and/or that the document has not been tampered with following sending by the authorized sender).

Continuing with the example of FIG. 3, token receipt engine 206 (FIG. 2) causes receipt, from the delegation recipient device, of token 304 and subject data 318 (e.g., a print job). The subject data 318 is data to be acted upon or utilized in conjunction with the functionality authorized to be performed at the target device (e.g. the ability to print at the target device).

Continuing with the example of FIG. 3, validity engine 208 (FIG. 2) causes a confirmation of the validity or authenticity of the received token 304. In this example, confirming validity of token 304 includes accessing a stored public key 322 associated with the user of the delegation requestor device or with the digital signature 320. In one example, confirming validity of token 304 includes decrypting at least a portion of the received token 304 utilizing the public key 322 and comparing a hash contained within the decrypted portion of the received token 304 to a hash separately generated from the token 304 to enable verification of the authenticity of the token 304. In one example, if the decrypted hash and the generated hash match, the received token 304 is deemed authenticated.

Continuing with the example of FIG. 3, subject data engine 210 (FIG. 2) causes sending of the subject data 318 to the target device for the target device to utilize the designated functionality 310 in association with the subject data 318. In this example, security accountability data 324 is recorded and stored. Security accountability for the delegation transaction remains with the delegation requestor device, as the delegated exercise of the functionality at the target device remains traceable to the delegation requestor device. In one example, the exercise of the functionality at the target device may be traceable to both the delegation requestor device and to the delegation recipient device. In another example, the exercise of the functionality at the target device may be traceable to the delegation requester device, but is not traced to the delegation recipient device.

Figure 4:
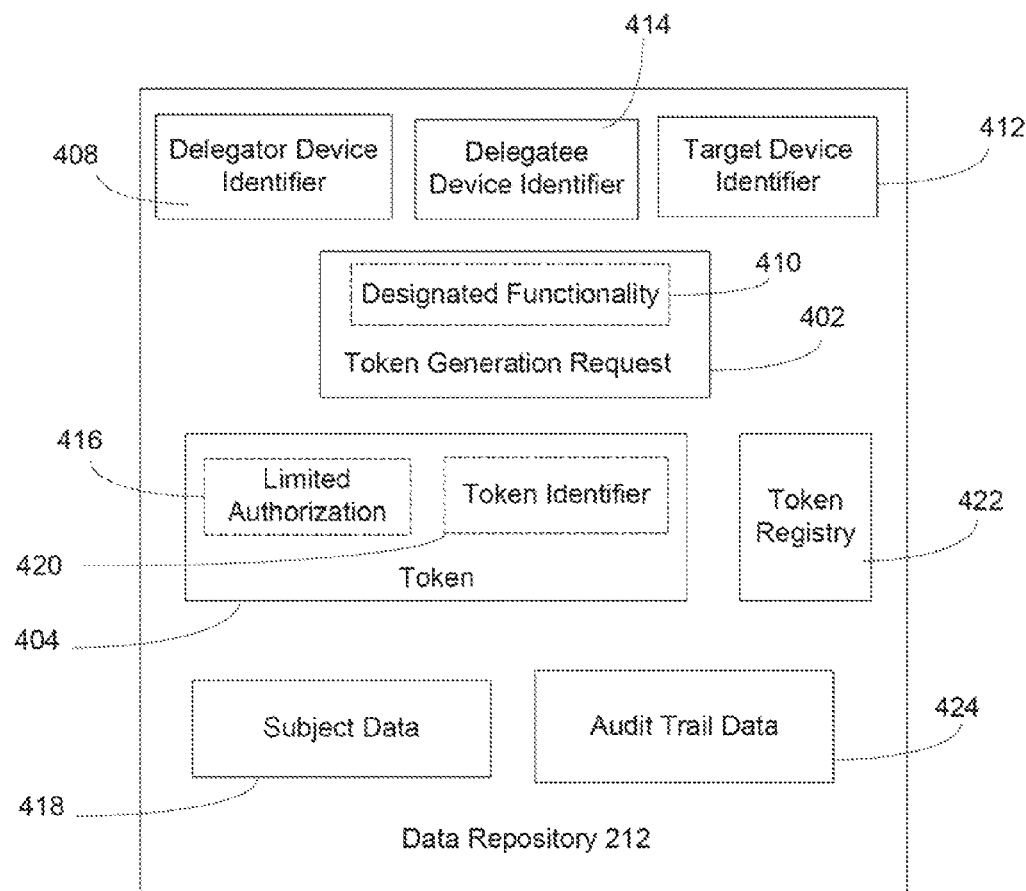
FIG. 4 is a block diagram depicting another example data structure for a system to provide device functionality in association with subject data utilizing authorization tokens.

FIG. 4 depicts another example implementation of data repository 212. In this example, repository 212 includes a token generation request 402, a token 404, an identifier for a delegator device 408, a designated functionality 410, an identifier for a target device 412, an identifier for a delegatee device 414, a limited authorization 416, subject data 418, a token identifier 420, a token registry 422, and audit trail data 424. Referring back to FIG. 2 in view of FIG. 4, in an example, request engine 202 (FIG. 2) receives, via a network 116 (FIG. 1) an authorization token request 402. The request is received from a delegator device, identified by delegator device identifier 408, that has authority to utilize a designated functionality 410 (e.g., an ability to print, scan, store or edit an electronic document or print job or other subject data at a target device, identified by target device identifier 412, that is also connected to the network 116. The token 404 is to provide for a delegatee device, identified by delegatee device identifier 414, a limited authorization 416 to utilize the designated functionality 410. In an example wherein the target device is a printer, the limited authorization 416 may be an authorization to print exclusively in a draft mode [e.g., versus printing in a high quality print mode], or an authorization to print restricted to a specified number of times or a specified time of day. In an example wherein the target device is a server or other non-printing computing device, the limited authorization 416 may be an authorization for an operation to create, read, edit, copy, delete, or store an electronic document or other subject data 418.

Continuing with the example of FIG. 4, token sending engine 204 (FIG. 2) causes generating and sending of a token 404 to the delegatee device. In the example of FIG. 4, the token 404 that is generated and sent includes a token identifier 420. As used herein a "token identifier" refers generally to something (e.g., any text, number, PIN, password, character string, image, graphic, or other data or element) that can be processed and stored by a computer, and that identifies, indicates, or names a token. In a particular example, token identifier 420 may be a randomly generated string that identifies or names the token 404. In the example of FIG. 4, the token sending engine 204 causes the token identifier 420 to be stored in a token registry 422. As used herein, a "registry" refers to a database or any organized collection of data in digital form such that it can be stored in computer memory or a data storage device. While in the example of FIG. 4 the token registry 422 is a database stored at data repository 212, in other examples the token registry may be stored at another memory or another computing device accessible to system 102 (FIGS. 1 and 2).

Continuing with the example of FIG. 4, token receipt engine 206 (FIG. 2) causes receipt, from the delegatee device, of the token 404 and subject data 418. The subject data 418 is data to be acted upon or utilized in conjunction with the functionality authorized to be performed at the target device (e.g., printing, scanning, storing or editing of the subject data) at the target device).

Continuing with the example of FIG. 4, validity engine 208 (FIG. 2) causes a confirmation of the validity or authenticity of the received token 404. In this example, confirming validity of token 404 includes accessing the token registry 422 and confirming that the token identifier 420 that was included in the received token 404 matches the token identifier stored in the token registry 422. In examples, the token identifier 420 may be in text, numerical, PIN, password, character string, image, or graphic format, or in any other format, that can be that can be processed and stored by a computer as digital data.

Continuing with the example of FIG. 4, subject data engine 210 (FIG. 2) causes sending of the subject data 418 to the target device, for the target device to utilize the designated functionality 410 in association with the subject data 418. In this example, audit trail data 424 is recorded and stored. Audit trail accountability for the delegation transaction remains with the delegator device, as the delegated exercise of the functionality at the target device remains traceable via audit trail data 424 to the delegator device. In one example, the exercise of the functionality at the target device may be traceable to the delegator device, but not traced to the delegatee device. In this manner, a delegation of target device functionality can be accomplished, with audit trail accountability to the delegator device, without a need for the delagatee device to be identified to system 102.

In the foregoing discussion of FIGS. 2 and 3, engines 202, 204, 206, 208, 210 were described as combinations of hardware and programming. Engines 202, 204, 206, 208, 210 may be implemented in a number of fashions. Looking at FIG. 5 the programming may be processor executable instructions stored on a tangible memory resource 502 and the hardware may include a processing resource 504 for executing those instructions. Thus memory resource 502 can be said to store program instructions that when executed by processing resource 504 implement system 102 of FIGS. 1 and 2.

Memory resource 502 represents generally any number of memory components capable of storing instructions that can be executed by processing resource 504. Memory resource 502 is non-transitory in the sense that it does not encompass a transitory signal but instead is made up of more or more memory components configured to store the relevant instructions. Memory resource 502 may be implemented in a single device or distributed across devices. Likewise, processing resource 504 represents any number of processors capable of executing instructions stored by memory resource 502. Processing resource 504 may be integrated in a single device or distributed across devices. Further, memory resource 502 may be fully or partially integrated in the same device as processing resource 504, or it may be separate but accessible to that device and processing resource 504.

In one example, the program instructions can be part of an installation package that when installed can be executed by processing resource 504 to implement system 102. In this case, memory resource 502 may be a portable medium such as a CD, DVD, or flash drive or a memory maintained by a server from which the installation package can be downloaded and installed. In another example, the program instructions may be part of an application or applications already installed. Here, memory resource 502 can include integrated memory such as a hard drive, solid state drive, or the like.

Figure 5:
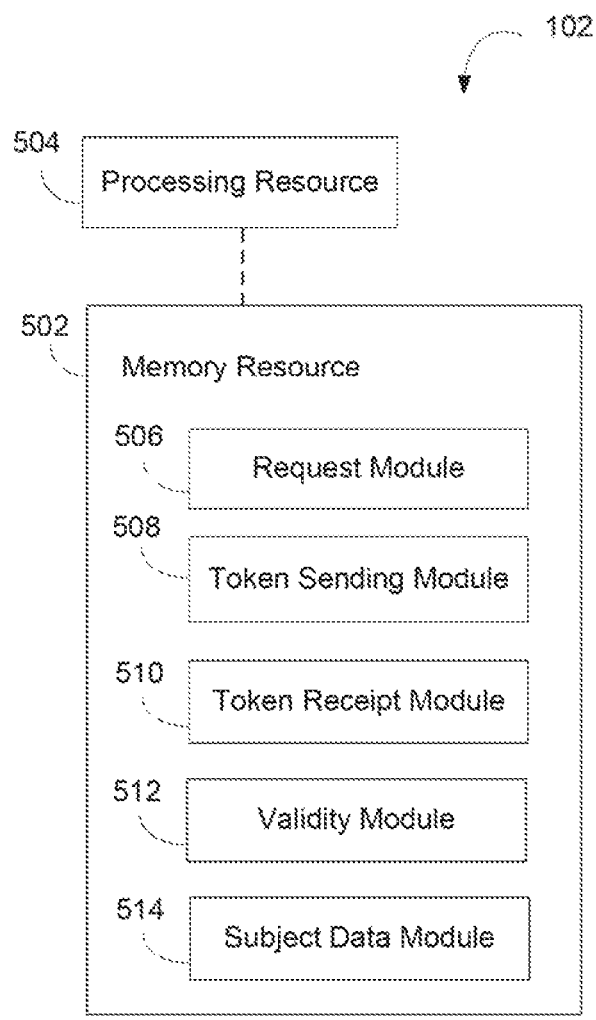
FIG. 5 is a block diagram depicting a memory resource and a processing resource according to an example.

In FIG. 5, the executable program instructions stored in memory resource 502 are depicted as request module 506, token sending module 508, token receipt module 510, validity module 512, and subject data module 514. Request module 506 represents program instructions that when executed by processing resource 504 may perform any of the functionalities described above in relation to request engine 202 of FIG. 2. Token sending module 508 represents program instructions that when executed by processing resource 504 may perform any of the functionalities described above in relation to token sending engine 204 of FIG. 2. Token receipt module 510 represents program instructions that when executed by processing resource 504 may perform any of the functionalities described above in relation to token receipt engine 206 of FIG. 2. Validity module 512 represents program instructions that when executed by processing resource 504 may perform any of the functionalities described above in relation to validity engine 208 of FIG. 2. Subject data module 514 represents program instructions that when executed by processing resource 504 may perform any of the functionalities described above in relation to subject data engine 210 of FIG. 2.

Illustrative Example

Figure 6:
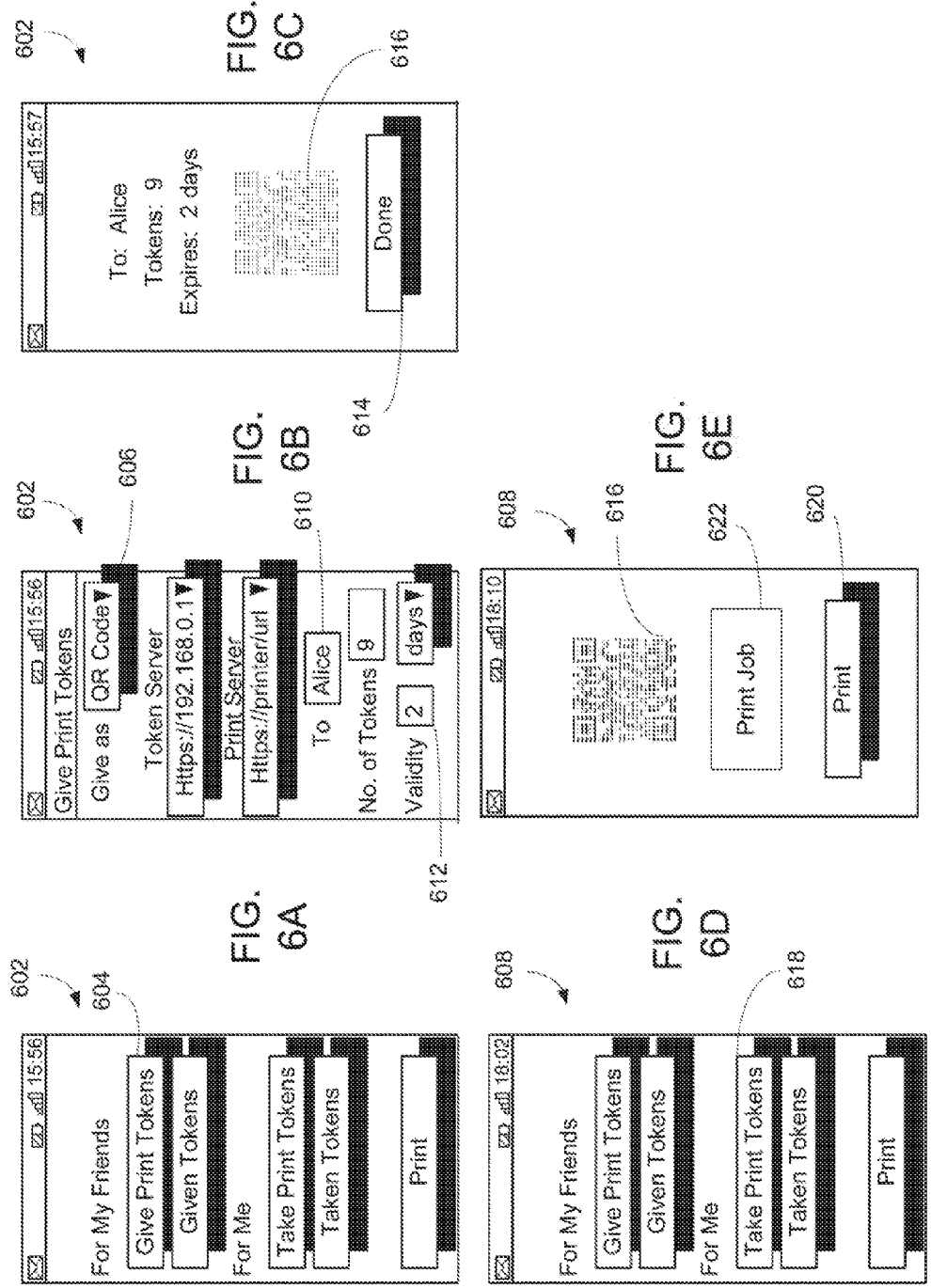
FIGS. 6A-6E illustrate an example of providing printer functionality in association with a print job utilizing authorization tokens.

FIGS. 6A-6E illustrate an example of providing device functionality in association with subject data utilizing authorization tokens. Turning to FIG. 6A, in view of FIG. 2, system 102 (FIG. 2) provides, as a web service visible at a first smartphone 602 associated with a user "Bob", a first graphic user interface to enable the user "Bob" to give print tokens to other computing devices for the benefit of other users. In the example of FIG. 6A system 102 receives, via a network and from the first smart phone 602 that has authorization to utilize a functionality at a printer, a request for generation and sending of nine authorization tokens. In this example the request is initiated by a user "Bob" at the first smartphone 602 by the user's interaction with the "give print tokens" graphic user interface icon 604.

Turning to FIG. 6B, in this example the user "Bob", by interacting (e.g., via touch at a touchscreen) with the "Give as a QR Code" 606 graphic user interface icon presented as a web application at the first smartphone 602, requests that the tokens be generated and sent in a QR Code® encoded format. In other examples, the tokens may be generated and sent in other encoded formats, or in an unencoded format. Each token is to provide to a second smartphone 608 associated with a user "Alice" 610 a limited authorization to utilize prescribed functionality at the printer. In this example, the tokens are to be generated and delivered with the authorization limitation that the tokens will expire two days 612 after delivery to the second smartphone 608 utilized by user "Alice." In another example, the limited authorization may be a restriction on a number of times a print job may be printed, or a restriction as to time of day for printing.

In an example, the tokens may be restricted to utilization by the second smartphone, or the second smartphone under the control of user "Alice." In another example, the tokens may transferable to another computing device associated with the user Alice. In another example, the tokens may transferable to another computing device without restriction.

Moving to FIG. 6C, by interacting with the "Done" 614 graphic user interface icon at the first smartphone, the user "Bob" causes system 102 to send the nine encoded tokens, including a first token 616 to the second smartphone 608.

Moving to FIG. 6D, by interacting with the "Take Print Tokens" 618 graphic user interface icon at the second smartphone 608, the user "Alice" causes the second smartphone 608 to pick up or receive the encoded tokens including the first token 616.

Moving to FIG. 6E, by interacting with the "Print" 620 graphic user interface icon at the second smartphone 608, the user "Alice" causes the second smartphone 608 to send the encoded first token 616 and subject data in the form of a print job 622 to a computing device that hosts system 102.

System 102 receives the first token 616 and the print job 622. In an example, the first token 616 may include a descriptor for the second smartphone associated with user "Alice." As used herein, a "descriptor" refers generally to an element or term (e.g., a word, phrase, character, number, or image) that has the function of describing, identifying, or indexing an item. System 102 may access a registry of computing devices approved for receiving the limited authorization to print, with system 102 confirming that the descriptor for the second smartphone that is included within the received first token 616 matches a computing device descriptor included within the registry. In this manner print delegation with source tracking can be accomplished. In another examples, system 102 may not require a smartphone descriptor-to-registry identification of the second smartphone 608.

After confirming the validity of the first token 616, system 102 sends the print job 622 to the printer for printing, and creates and/or stores data establishing security accountability for the printing of the job in the form of an audit trail traceable to the first smartphone and the user "Bob."

Figure 7:
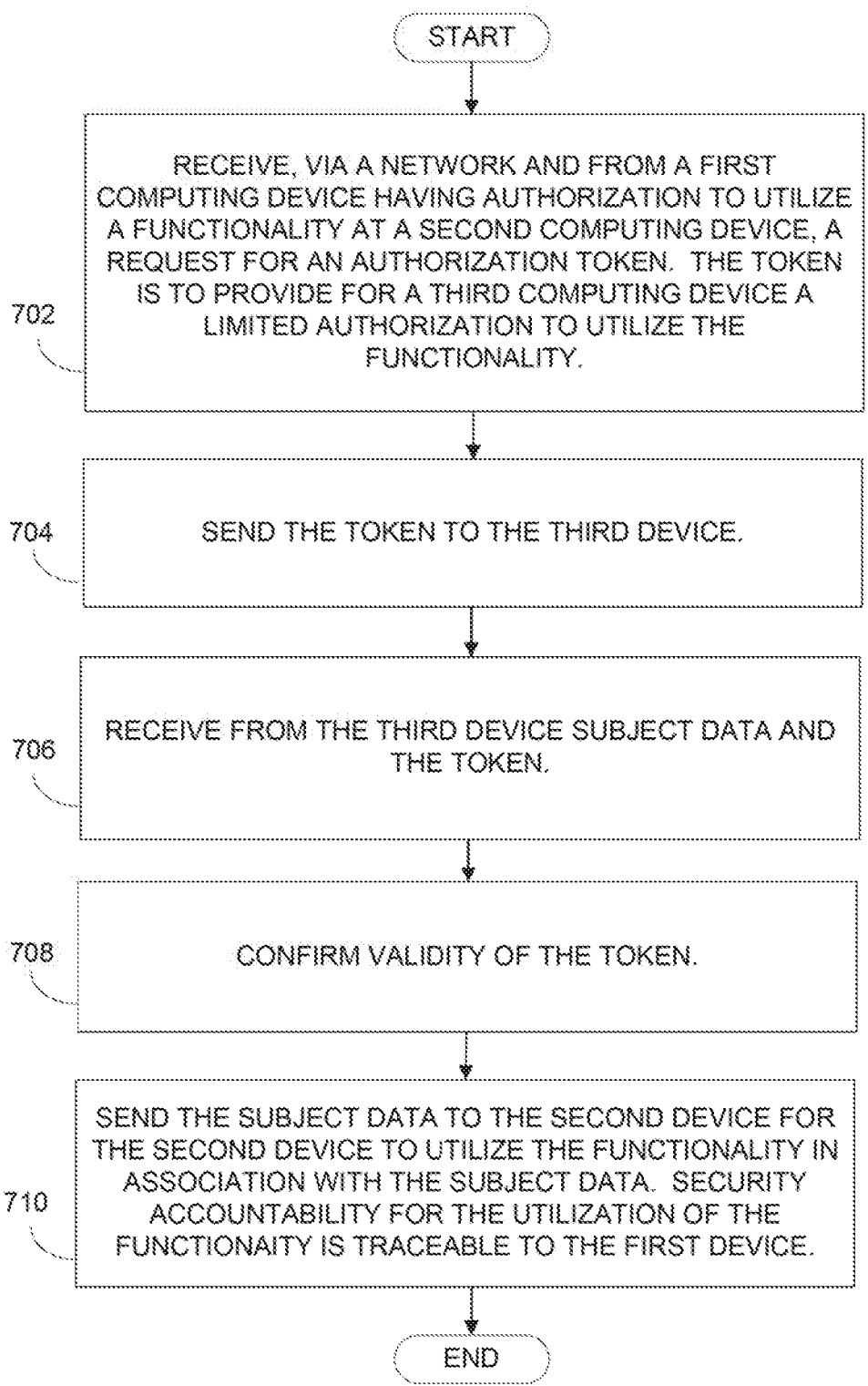
FIG. 7 is a flow diagram depicting steps taken to implement an example.

Operation:

FIG. 7 is a flow diagram of steps taken to implement a method for providing device functionality in association with subject data utilizing authorization tokens. In discussing FIG. 7, reference may be made to the components depicted in FIGS. 2 and 5. Such reference is made to provide contextual examples and not to limit the manner in which the method depicted by FIG. 7 may be implemented. A request for an authorization token is received via a network and from a first computing device having authorization to utilize a functionality at a second computing device. The token is to provide for a third computing device a limited authorization to utilize the functionality (block 702). Referring back to FIGS. 2 and 5, request engine 202 (FIG. 2) or request module 506 (FIG. 5), when executed by processing resource 504, may be responsible for implementing block 702.

The token is sent to the third device (block 704). Referring, back to FIGS. 2 and 5, token sending engine 204 (FIG. 2) or token sending module 508 (FIG. 5), when executed by processing resource 504, may be responsible for implementing block 704.

Subject data and the token are received from the third device (block 706). Referring back to FIGS. 2 and 5, token receipt engine 206 (FIG. 2) or token receipt module 510 (FIG. 5), when executed by processing resource 504, may be responsible for implementing block 706.

Validity of the token is confirmed (block 708). Referring back to FIGS. 2 and 5, validity engine 208 (FIG. 2) or validity module 512 (FIG. 5), when executed by processing resource 504, may be responsible for implementing block 708.

The subject data is sent to the second device for the second device to utilize the functionality in association with the subject data. Security accountability for the utilization of the functionality at the second device is traceable to the first device (block 710). Referring back to FIGS. 2 and 5, rescale engine 208 (FIG. 2) or subject data module 514 (FIG. 5), when executed by processing resource 504, may be responsible for implementing block 710.

Conclusion

FIGS. 1-7 aid in depicting the architecture, functionality, and operation of various embodiments. In particular, FIGS. 1-5 depict various physical and logical components. Venous components are defined at least in part as programs or programming. Each such component, portion thereof, or various combinations thereof may represent in whole or in part a module, segment, or portion of code that comprises one or more executable instructions to implement any specified logical function(s). Each component or various combinations thereof may represent a circuit or a number of interconnected circuits to implement the specified logical function(s). Embodiments can be realized in any memory resource for use by or in connection with processing resource. A "processing resource" is an instruction execution system such as a computer/processor based system or an ASIC (Application Specific Integrated Circuit) or other system that can fetch or obtain instructions and data from computer-readable media and execute the instructions contained therein. A "memory resource" is any non-transitory storage media that can contain, store, or maintain programs and data for use by or in connection with the instruction execution system. The term "non-transitory" is used only to clarify that the term media, as used herein, does not encompass a signal. Thus, the memory resource can comprise any one of many physical media such as, for example, electronic, magnetic, optical, electromagnetic, or semiconductor media. More specific examples of suitable computer-readable media include, but are not limited to, hard drives, solid state drives, random access memory (RAM), read-only memory (ROM), erasable programmable read-only memory, flash drives and portable compact discs.

Although the flow diagram of FIG. 7 shows a specific order of execution, the order of execution may differ from that which is depicted. For example, the order of execution of two or more blocks or arrows may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details and embodiments may be made without departing from the spirit and scope of the invention that is defined in the following claims. All of the features, disclosed in this specification (including any accompanying claims, abstract and drawings), and/or all of the steps of any method or process so disclosed, may be combined in any combination, except combinations where at least some of such features and/or steps are mutually exclusive.

What is claimed:

1. A memory resource storing instructions that when executed cause a processing resource to implement a system for providing device functionality utilizing authorization tokens, the instructions comprising:

a request module, to receive, via a network and from a first computing device having authorization to utilize a functionality at a second computing device, a request for an authorization token,
  wherein the token is to provide for a third computing device a limited authorization to utilize the functionality;
a token sending module, to send the token to the third device;
a token receipt module, to receive from the third device subject data and the token;
a validity module, to confirm validity of the token; and
a subject data module, to send the subject data to the second device for the second device to utilize the functionality in association with the subject data, with security accountability traceable to the first device.

2. The memory resource of claim 1, wherein the second computing device is a printer, the subject data is a print job, and the authorized functionality is a printing or scanning operation.

3. The memory resource of claim 1, wherein the subject data is an electronic document, and the authorized functionality is a document creation, reading, editing, copying, deletion, or storage operation.

4. The memory resource of claim 1, wherein the security accountability for utilizing the functionality is not traceable to the third device.

5. The memory resource of claim 1,
  wherein the token includes a digital signature and an instruction that the functionality be provided for the second device;
  wherein confirming validity of the token includes accessing a public key associated with the user or the digital signature.

6. The memory resource of claim 1, wherein the token sending module includes instructions to generate the token.

7. The memory resource of claim 6,
  wherein the generated token includes a token identifier;
  wherein the token sending module includes instructions to store the token identifier in a registry; and
  wherein confirming validity of the received token includes accessing the registry and confirming a token identifier included in the received token matches the token identifier stored in the registry.

8. The memory resource of claim 7, wherein the token identifier is a randomly generated string.

9. The memory resource of claim 1, wherein the limited authorization includes an expiration date or a number of times the functionality can be exercised.

10. The memory resource of claim 2, wherein the limited authorization includes at least one of a restriction on a number of times the subject data can be printed, a restriction to exclusively permit black and white printing, a restriction to exclusively permit draft mode printing, and a restriction as to time of day for printing.

11. A system to delegate authorization to utilize functionality at computing devices, comprising:
  a request engine, to receive, via a network and from a first computing device with authorization to employ a functionality at a second computing device, a request for an authorization token, the token to provide to a third computing device limited authorization to employ the functionality;
  a token sending engine, to generate the requested token, and to send the token to the third device;
  a token receipt engine, to receive the token and subject data from the third device;
  a validity engine, to determine the token is valid by utilizing a digital signature included within the token, or by comparing a token identifier within the token to a token identifier stored within a registry; and
  a subject data engine, to, in response to the validity determination, send the subject data to the second device for the second device to utilize the functionality in association with the subject data, with a security audit trail for utilizing the functionality indicating the first device.

12. The system of claim 11, wherein the token is transferable from the third device to a fourth device.

13. The system of claim 11,
  wherein the token includes a descriptor for the third device;
  wherein the validity engine is to access a registry of computing devices approved for receiving the limited authorization, and confirming the received token includes a descriptor matching a device descriptor included within the registry.

14. The system of claim 11, wherein the token is sent in an encoded format.

15. A method for delegation of authorization to utilize a printer, comprising:
  receiving, via a network and from a first computing device having authorization to utilize a functionality at a printer, a request for an authorization token,
    wherein the token is to provide to a second computing device a limited authorization to utilize the functionality;
  sending the token to the second computing device;
  receiving from the second device a print job and the token;
  confirming validity of the token;
  sending the job to the printer for the printer to utilize the functionality in association with the job, with security accountability for utilizing the functionality traceable to the first device.

* * * * *

UNITED STATES PATENT AND TRADEMARK OFFICE
CERTIFICATE OF CORRECTION

PATENT NO. : 9,858,016 B2  
APPLICATION NO. : 15/120460  
DATED : January 2, 2018  
INVENTOR(S) : Kapaleeswaran Viswanathan et al.

Page 1 of 1

It is certified that error appears in the above-identified patent and that said Letters Patent is hereby corrected as shown below:

On the Title Page

Item (57), Line 3, delete "authorization," and insert -- authorization --, therefor.

Signed and Sealed this  
Nineteenth Day of November, 2019

Andrei Iancu  
*Director of the United States Patent and Trademark Office*